US006731856B1

(12) United States Patent
Fujita et al.

(10) Patent No.: US 6,731,856 B1
(45) Date of Patent: May 4, 2004

(54) ORGANIC WAVEGUIDE AND MANUFACTURING METHOD THEREOF AND OPTICAL PART USING THE SAME

(75) Inventors: Hideaki Fujita, Nara (JP); Yorishige Ishii, Yamatotakada (JP); Toshihiro Tamura, Nara (JP); Yukio Kurata, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/444,460

(22) Filed: Nov. 22, 1999

(30) Foreign Application Priority Data

Nov. 27, 1998 (JP) .............................. 10-338047

(51) Int. Cl.[7] ................................. G02B 6/10
(52) U.S. Cl. ........................ 385/143; 385/129
(58) Field of Search ................. 385/141–145, 385/129, 130

(56) References Cited

U.S. PATENT DOCUMENTS

| 4,464,762 A | * | 8/1984 | Furuya .................... 372/50 |
| 5,108,201 A | * | 4/1992 | Matsuura et al. ........... 385/143 |
| 5,235,663 A | * | 8/1993 | Thomas .................... 385/129 |
| 5,406,406 A | * | 4/1995 | Yamamoto et al. .......... 359/326 |
| 5,485,540 A | * | 1/1996 | Eda ........................ 385/129 |
| 5,497,445 A | * | 3/1996 | Imoto ...................... 385/132 |
| 5,572,619 A | * | 11/1996 | Maruo et al. .............. 385/143 |
| 5,598,501 A | * | 1/1997 | Maruo et al. .............. 385/143 |
| 5,692,088 A | * | 11/1997 | Ishiharada et al. ......... 385/125 |
| 5,850,498 A | * | 12/1998 | Shacklette et al. ......... 385/129 |
| 5,940,568 A | * | 8/1999 | Losch ...................... 385/129 |
| 6,112,002 A | * | 8/2000 | Tabuchi .................... 385/214 |

FOREIGN PATENT DOCUMENTS

| JP | 63-308920 | 12/1988 |
| JP | A49807 | 1/1992 |
| JP | 05-273427 | 10/1993 |
| JP | 07-092337 | 4/1995 |
| JP | A875942 | 3/1996 |
| JP | 08-184718 | 7/1996 |
| JP | 09-059380 | 3/1997 |
| JP | A9222524 | 8/1997 |
| JP | 10-282351 | 10/1998 |

OTHER PUBLICATIONS

Masayuki Izutsu, "On the Use of Metal for Optical Waveguides", Institute of Electronics, Information and Communication Engineers Electronics Society Convention Lecture Memoir 1, pp. 406–407, published Sep. 7, 1998.

* cited by examiner

Primary Examiner—Hemang Sanghavi
Assistant Examiner—Scott Knauss
(74) Attorney, Agent, or Firm—Birch, Stewart, Kolasch & Birch, LLP

(57) ABSTRACT

In the organic waveguide of the present invention, on a buffer layer and a core section made of organic polymer which are formed on a substrate, there is provided a masking clad which serves as a mask when the organic polymer is processed by dry etching and which constitutes an upper clad, and an overclad made of inorganic dielectric such as silicon oxide is formed around the core section.

20 Claims, 5 Drawing Sheets

ORGANIC WAVEGUIDE AND MANUFACTURING METHOD THEREOF AND OPTICAL PART USING THE SAME

FIELD OF THE INVENTION

The present invention relates to an organic waveguide having a core section made of organic polymer, which is used for optical parts such as optical integrated circuits, optical communications devices, and optical interconnections, and a manufacturing method thereof.

BACKGROUND OF THE INVENTION

As a core material of an organic waveguide, inorganic materials such as quartz glass and multi-component glass have been widely used conventionally. The feature of waveguides made of these materials is that the propagation loss is small and the propagation band is wide. Meanwhile, organic materials, despite their large propagation loss compared with inorganic materials, have been catching attention as a waveguide material due to among other things the property which allows the film to be desirably processed and to be easily made thick as well as the low costs they offer.

A common manufacturing method of an organic waveguide starts with formation of a core section by forming an organic film in an appropriate thickness and thereafter by patterning the organic film, followed by application of organic polymer as an overclad having a refractive index lower than that of the core section.

As the method of a patterning process, a method by cutting and a method by wet etching, etc., as disclosed in Japanese Unexamined Patent Publication No. 222524/1997 (Tokukaihei 9-222524) (Published Date : Aug. 26, 1997) have been available. However, the method which is widely adopted is the method by reactive ion etching (RIE) using an oxygen gas, which is convenient and which allows a high precision process.

However, RIE using an oxygen gas does not allow the use of a positive resist of novolak resin as a mask due to its small etching selective ratio with respect to the organic polymer.

Thus, there has been a method in which a silicon contained resist having a large etching selective ratio with respect to the organic polymer is used as a mask. However, in this method, it is -required to remove the resist after RIE, and due to the fact that the surface of the resist is changed in property by the oxygen ion, removal of the resist by an organic solvent is difficult.

Further, as disclosed in Japanese Unexamined Patent Publication No. 9807/1992 (Tokukaihei 4-9807) (Published Date: Jan. 14, 1992) and No. 75942/1996 (Tokukaihei 8-75942) (Published Date : Mar. 22, 1996), there has been a method available in which the core section is processed by RIE using an oxygen gas with the use of a metal such as copper or aluminium on which the photosensitive resist pattern has been transferred, wherein the metal is used as an intermediate mask on the organic polymer.

The following describes the manufacturing method of the organic waveguide employing the above method referring to FIG. 5.

(1) First, as shown in FIG. 5(a), organic polymer is applied as a buffer layer 32 on a substrate 31 by spin-coating and the substrate complex is baked.

(2) Then, organic polymer, to be a core section 33, having a higher refractive index than that of the buffer layer 32 is applied by spin-coating followed by baking.

(3) Then, on the substrate complex, copper or aluminium is deposited as a metal mask 37, for example, by sputtering.

(4) Then, a photoresist 36 is applied, and the photoresist 36 is patterned by photolithography.

(5) Then, as shown in FIG. 5(b), the mask pattern is transferred onto the metal mask 37 by ion-milling or wet etching.

(6) Then, as shown in FIG. 5(c), the organic polymer is etched by RIE using an oxygen gas to form the core section 33.

(7) Then, as shown in FIG. 5(d), the metal mask 37 is removed by wet etching, and as shown in FIG. 5(e) and FIG. 5(f), organic polymer having a lower refractive index than that of the core section 33 is applied as an overclad 35 followed by baking. The conventional organic waveguide is manufactured by the described steps.

However, in the described waveguide having the overclad made of organic polymer, the organic polymer is applied by spin-coating so as to cover the core section 33 having a step-difference. Thus, as shown in FIG. 5(e), the overclad 35 tends to be thick at side portions of the organic waveguide, or a waveguide of a buried type as shown in FIG. 5(f) results.

When such a organic waveguide is to be coupled with other optical elements such as a semiconductor laser, a further process is required on the overclad 35 on the side portions, and for this reason it has been difficult in conventional organic waveguides to realize integration of other optical elements on the same substrate.

Alternatively, air may be utilized as an overclad instead of forming the overclad 35. However, this is not without problems that a difference in refractive index becomes too large and the core section cannot be protected, to name a few.

Further, when the process is to be carried out by RIE using a metal mask or a silicon contained resist as a mask, a residue is likely to be generated on the organic polymer by the mask material, and it becomes difficult to remove the mask after RIE. Furthermore, because the adhesion between metal and organic polymer is generally poor, when used as a mask, the metal is easily removed and it becomes difficult to carry out high precision patterning.

SUMMARY OF THE INVENTION

An object of the present invention is to provide an organic waveguide which can be easily integrated with other optical elements, and which generates less residue in an RIE process, and which can be manufactured with less steps, and a manufacturing method thereof, and also to provide an optical part on which such an organic waveguide and an optical element such as a semiconductor laser or photoreceptive element are integrated on the same substrate.

In order to achieve this object, an organic waveguide in accordance with the present invention includes a core section made of organic polymer, and a clad section covering the core section and made of inorganic dielectric having a lower refractive index than that of the core section. Further, in the organic waveguide in accordance with the present invention, it is preferable that the inorganic dielectric to be the clad section is formed by a sputtering method, CVD method, or vapor deposition method.

Further, in order to achieve the above object, a manufacturing method of the organic waveguide of the present invention includes the step of forming an inorganic dielectric layer as the clad section on an organic polymer layer processed into the core section, and the inorganic dielectric layer is formed by a CVD method, sputtering method, or vapor deposition method.

With the above arrangement and method, because the clad section is made of inorganic dielectric having a lower refractive index than that of the core section, it is possible to use the sputtering method, CVD method, or vapor deposition method, etc., to form the clad section, which were not allowed with the organic polymer, thus forming the clad section in the same shape as that of the core section with ease.

As a result, an organic waveguide which can be desirably coupled with other optical elements can be obtained without the conventional process on the side portions of the clad section, thereby allowing integration with other optical elements and simplifying manufacturing steps.

In the organic waveguide of the present invention, it is further preferable that a portion of the clad section constitutes a masking clad section which serves as a mask when processing the core section.

Further, the manufacturing method of the organic waveguide of the present invention may include the steps of forming an organic polymer layer which becomes a core section by processing; forming an inorganic dielectric layer to be a clad section on the organic polymer layer; processing the inorganic dielectric layer into a shape covering only an upper surface of the core section; and processing the inorganic dielectric layer into the core section by dry etching using as a mask the inorganic dielectric layer processed.

With this arrangement and method, because the clad section covering the upper surface of the core section is used as a mask, it is not required to remove the mask after the core section is processed, and as a result the manufacturing steps of the organic waveguide can be reduced and other elements are prevented from being adversely affected when the mask is removed. Here, in order to realize the masking upper clad section, it is required to select an inorganic dielectric having a large selective ratio with respect to the organic polymer in RIE using an oxygen gas.

An optical part of the present invention including an organic waveguide and an optical element such as a photo-emitting element, photo-receptive element, and lens, which are formed on a single substrate, includes an organic waveguide which includes a core section made of organic polymer and a clad section covering the core section and made of inorganic dielectric having a lower refractive index than that of the core section.

Alternatively, the optical part of the present invention may have an arrangement in which an organic waveguide and an optical element such as a photo-emitting element, photo-receptive element, and lens are formed on a single substrate, wherein the optical part includes an organic waveguide which includes a core section made of organic polymer and a clad section covering the core section and made of inorganic dielectric having a lower refractive index than that of the core section, and the inorganic dielectric to be the clad section is formed by a sputtering method, CVD method, or vapor deposition method.

Further, the optical part of the present invention may have an arrangement in which an organic waveguide and an optical element such as a photo-emitting element, photo-receptive element, and lens are formed on a single substrate, wherein the optical part includes an organic waveguide which is manufactured by a manufacturing method which includes the step of forming an inorganic dielectric layer to be a clad section on an organic polymer layer processed into a core section so as to cover the core section, and the inorganic dielectric layer is formed by a CVD method, sputtering method, or vapor deposition method.

Further, the optical part of the present invention may have an arrangement in which an organic waveguide and an optical element such as a photo-emitting element, photo-receptive element, and lens are formed on a single substrate, wherein the optical part includes an organic waveguide which is manufactured by a manufacturing method which includes the steps of: forming an organic polymer layer which becomes a core section by processing; forming an inorganic dielectric layer to be a clad section on the organic polymer layer; processing the inorganic dielectric layer into :a shape covering only an upper surface of the core section; and processing the inorganic dielectric layer into the core section by dry etching using as a mask the inorganic dielectric layer processed.

As described, the organic waveguide of the present invention can be easily integrated with other optical elements, and generates less residue in an RIE process, and can be manufactured by less steps. By using such an organic waveguide as a constituting element, optical parts which are processed with precision and which are highly integrated can be obtained inexpensively.

A manufacturing method of an optical part of the present invention is for manufacturing an optical part in which an organic waveguide and an optical element such as a photo-emitting element, photo-receptive element, and lens are formed on a single substrate, and which includes an organic waveguide which includes a core section made of organic polymer and a clad section covering the core section and made of inorganic dielectric having a lower refractive index than that of the core section, wherein, using a semiconductor laser as the photo-emitting element, a bonding pad of the semiconductor laser or a pad used in wiring is formed in a same step with a light-shield film which is to cover the clad section of the organic waveguide.

Alternatively, the manufacturing method of an optical part of the present invention may be for manufacturing an optical part in which an organic waveguide and an optical element such as a photo-emitting element, photo-receptive element, and lens are formed on a single substrate, and which includes an organic waveguide which includes a core section made of organic polymer and a clad section covering the core section and made of inorganic dielectric having a lower refractive index than that of the core section, and the inorganic dielectric to be the clad section is formed by a sputtering method, CVD method, or vapor deposition method, wherein, using a semiconductor laser as the photo-emitting element, a bonding pad of the semiconductor laser or a pad used in wiring is formed in a same step with a light-shield film which is to cover the clad section of the organic waveguide.

Further, the manufacturing method of an optical part of the present invention may be for manufacturing an optical part in which an organic waveguide and an optical element such as a photo-emitting element, photo-receptive element, and lens are formed on a single substrate, and which includes an organic waveguide which is manufactured by a manufacturing method which includes the step of forming an inorganic dielectric layer to be a clad section on an organic polymer layer processed into a core section so as to cover the core section, and the inorganic dielectric layer is formed by a CVD method, sputtering method, or vapor deposition method, wherein, using a semiconductor laser as the photo-emitting element, a bonding pad of the semiconductor laser or a pad used in wiring is formed in a same step with a light-shield film which is to cover the clad section of the organic waveguide.

Further, the manufacturing method of an optical part of the present invention may be for manufacturing an optical part in which an organic waveguide and an optical element such as a photo-emitting element, photo-receptive element, and lens are formed on a single substrate, and which includes an organic waveguide which is manufactured by a manufacturing method which includes the steps of: forming an organic polymer layer which becomes a core section by processing; forming an inorganic dielectric layer to be a clad section on the organic polymer layer; processing the inorganic dielectric layer into a shape covering only an upper surface of the core section; and processing the inorganic dielectric layer into the core section by dry etching using as a mask the inorganic dielectric layer processed, wherein, using a semiconductor laser, as the photo-emitting element, a bonding pad of the semiconductor laser or a pad used in wiring is formed in a same step with a light-shield film which is to cover the clad section of the organic waveguide.

With the manufacturing method of an optical part of the present invention, the bonding pad of the semiconductor laser or a wiring pad is formed in the same step with the light-shield film of the organic waveguide, thereby further simplifying the manufacturing steps of the optical part and therefore further reducing the manufacturing cost.

For a fuller understanding of the nature and advantages of the invention, reference should be made to the ensuing detailed description taken in conjunction with the accompanying drawings.

DESCRIPTION OF THE EMBODIMENTS

[First Embodiment]

Figure 1:
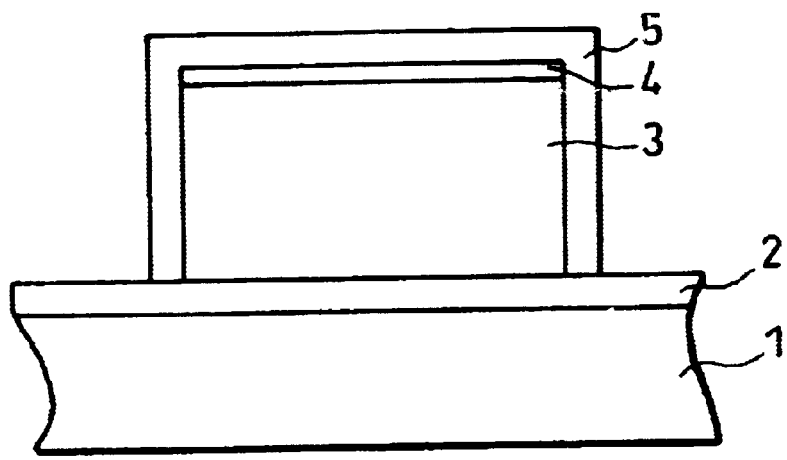
FIG. 1 is a schematic drawing showing a cross sectional shape of an organic waveguide in accordance with one embodiment of the present invention.

The following will describe one embodiment of the present invention referring to FIG. 1 and FIG. 2.

FIG. 1 is a schematic drawing showing a cross section of one example of an organic waveguide in accordance with the present invention. The following describes one example of the organic waveguide in accordance with the present invention referring to FIG. 1.

An organic waveguide has a substrate 1 made of silicon or other materials. On the substrate 1 is provided a silicon oxide film formed as a buffer layer 2 by the sputtering method or CVD method in a thickness of around 5 $\mu$m, and on which is a provided a core section 3 of an arbitrary shape made of organic polymer. On the core section 3 is provided a masking clad 4 made of inorganic dielectric, which constitutes an upper clad and serves as a mask when the core section 3 is processed. On top of this is provided an overclad 5 of several $\mu$m also made of inorganic dielectric, covering the core section 3.

As the inorganic dielectric of the masking clad 4 and overclad 5, a material having a lower refractive index than that of the core section 3 is selected. As such an inorganic dielectric having a lower refractive index than that of the core section 3, for example, silicon oxide may be used. As the depositing method of such a material, the CVD method, sputtering method, or vapor deposition method, etc., is used.

Note that, as the buffer layer 2, an organic polymer having a lower refractive index than that of the core section 3 may be used. The overclad 5 may be covered by a light-shield film made of metal such as aluminium having a thickness of around 1 $\mu$m. By covering the overclad 5 by the light-shield film, entry of unwanted light into the waveguide from outside can be prevented.

The following will describe one example of a manufacturing method of the waveguide referring to FIG. 2.

Figure 2A:
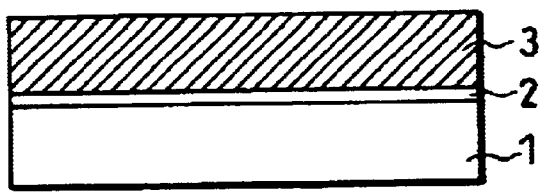
FIG. 2(a) through FIG. 2(e) are schematic drawings showing manufacturing steps of the organic waveguide of FIG. 1.

(1) As shown in FIG. 2(a), silicon oxide is deposited in a thickness of several $\mu$m as the buffer layer 2 by the sputtering method on the substrate 1 made of silicon. Here, the surface of the substrate 1 has been processed with polishing beforehand.

(2) Then, organic polymer such as polyimide is applied as the core section 3 on the substrate 1 by spincoating, and thereafter the organic polymer is baked. Here, the thickness of the organic polymer is selected depending on desired characteristics of the waveguide.

Figure 2B:
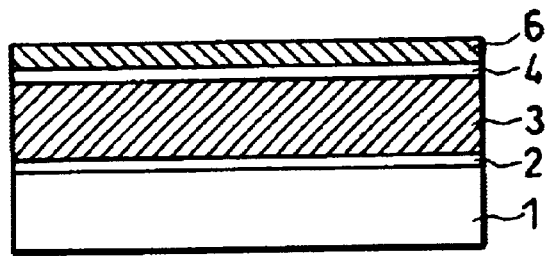

(3) Then, as shown in FIG. 2(b), silicon oxide is formed as the masking clad 4 on the core section 3 by the plasma CVD method. Then, on the silicon oxide film, a photoresist 6 is applied as a mask of the masking clad 4.

Figure 2C:
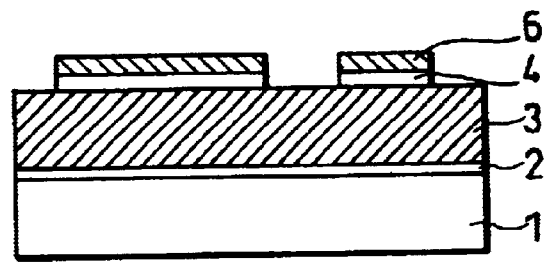

(4) Then, as shown in FIG. 2(c), the photoresist 6 is patterned into an arbitrary shape by photolithography, and the pattern is transferred to the masking clad 4 by RIE using a $CF_4$ (carbon tetrafluoride) gas.

Figure 2D:
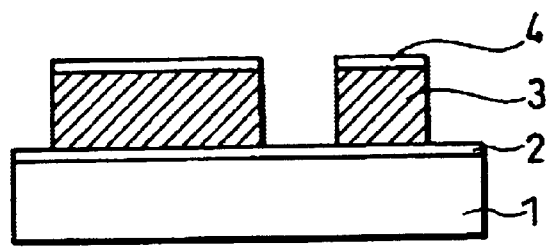

(5) Then, as shown in FIG. 2(d), a portion of the core section 3 which is not required is removed by RIE with an oxygen gas using the masking clad 4 as a mask. Here, the photoresist 6 is also removed simultaneously.

Figure 2E:
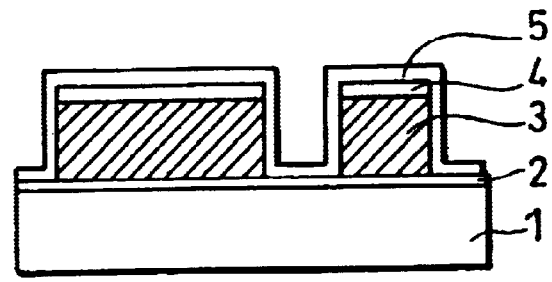

(6) Then, as shown in FIG. 2(e), silicon oxide is deposited as the overclad 5 by the plasma CVD method, thereby obtaining the organic waveguide.

In the organic waveguide having this arrangement, inorganic dielectric, rather than organic polymer, is used as the overclad, and for this reason the overclad 5 covering the core section 3 can be formed easily into the same shape as that of the core section 3. As a result, the organic waveguide can be easily coupled with other optical elements such as a semiconductor laser. Further, because coupling with other elements is easy on the same substrate, integration of optical elements can be realized.

Further, because the masking clad 4 made of inorganic dielectric, used as a mask of the core section 3 can be directly used as the upper clad, unlike the conventional example, it is not required to provide a step of removing the mask, thus reducing manufacturing steps. Further, because the mask is made of inorganic dielectric, compared with the case where a mask of metal film is used, it is possible to reduce the etching residue generated when the core section 3 is processed by RIE.

Note that, the described manufacturing steps are just one example, and the organic polymer may be processed by a processing method other than RIE, or partially modified steps may be adopted.

The following describes in more detail the material and deposition method, etc., of each component of the organic waveguide in accordance with the present invention.

As the organic polymer material constituting the core section 3, a material having a high transmissivity is preferable, and in view of integration with a semiconductor laser, because a heat treatment is required when forming ohmic electrodes, a heat resistance of not less than around 300° C. is required. Thus, of organic polymers, it is preferable as the core material to use polyimide, which has a high heat resistance and relatively high transmissivity. Further, though described later in detail, by the advantage that less etching residue is generated in the RIE process using an oxygen gas, among polyimides, a polyimide containing no silane and fluorinated polyimide are preferable. Particularly, by using fluorinated polyimide, transmissivity in near infra red range becomes high, and an organic waveguide with a small loss, suitable particularly for communications purposes can be obtained.

Generally, the refractive index of organic polymers such as polyimide is around 1.6, and thus as the inorganic dielectric material for the masking clad 4 and overclad 5, silicon oxide with a refractive index of 1.46 can be used. The silicon oxide can easily be formed into the same shape as that of the core section 3 by the CVD method, sputtering, or vapor deposition method. Further, because the inorganic dielectric film is more resistant to sputtering than the metal film, it is possible to reduce the etching residue generated when the core section 3 is processed by RIE, compared with the case where the metal film used as a mask.

Here, the generated states of etching residue differ, besides the mask material, depending on the organic polymer material to be processed.

The states of etching residue were compared by carrying out RIE using an oxygen gas with the combinations of two kinds of mask materials and three kinds of organic polymer materials, the mask materials being aluminium and silicon oxide and the organic polymer materials being a polyimide containing 26 molt of amino silane (polyimide A:Product Name PIG, provided by Chisso Corporation), a polyimide containing no silane (polyimide B:Product Name PIG, provided by Chisso Corporation, from which silane was removed), and a fluorinated polyimide (polyimide C:Product Name OPI-N2005, provided by Hitachi Chemical Co., Ltd.). The results are shown in Table 1.

TABLE 1

| Mask | Core Section | | |
|---|---|---|---|
| | Polyimide A | Polyimide B | Polyimide C |
| Aluminium | Residue | Residue | Residue |
| Silicon Oxide | Residue | No Residue | No Residue |

As shown in Table 1, the masks made of aluminium generated residue over the surface of the substrate in all samples. Meanwhile, the masks made of silicon oxide generated residue only in a silane component contained polyimide (polyimide A), and no residue was generated in a polyimide containing no silane (polyimide B) and a fluorinated polyimide (polyimide C). Note that, by covering lower electrodes in RIE, generation of residue induced by the lower electrodes is prevented.

When the mask is made of metal such as aluminium, the metal mask is easily sputtered during RIE with an oxygen gas, and the mask thus sputtered remains on the organic polyimide and causes residue. On the other hand, when the mask is made of inorganic dielectric such as silicon oxide, since inorganic dielectric is relatively resistant to sputtering, less residue is generated.

In the silane containing polyimide, the silicon component is not etched in RIE with an oxygen gas and remains, which causes residue. Thus, generation of residue can be suppresses using the polyimide containing no silane.

In the case where the fluorinated polyimide is used, the fluorine component is released during RIE, and the silicon component, which causes residue, is etched, thus eliminating generation of residue.

For the reasons set forth above, as the organic polymer material, the fluorinated polyimide or polyimide containing no silane is desirable.

Meanwhile, the adhesion between organic polymer and inorganic dielectric is generally poor, and they are susceptible to separation when subjected to a heat treatment at a temperature of around 300° C. As a result, it becomes difficult to integrate the organic waveguide and semiconductor laser on the same substrate. The fluorinated polyimide in particular presents the problem of poor adhesion by the fluorine component.

The adhesion can be improved by carrying out a surface treatment of the organic polymer by plasma, or by providing an adhesive layer made of adhesive.

The following describes the improved effect by the plasma process.

As the organic polymer, a fluorinated polyimide (Product Name OPI-N1005, provided by Hitachi Chemical Co., Ltd.), was used and the plasma process with an oxygen gas and nitrogen gas was carried out to determine whether adhesion with the inorganic dielectric would be improved.

The plasma process was carried out using a plasma CVD device (Mode 1PD200-ST, provided by SAMCO International) under the conditions of the pressure of 0.6 Torr, gas flow rate of 50 SCCM, and RF power of 250 W for 5 minutes. Continuously after the plasma process, silicon oxide to be a mask was deposited in the thickness of 2 $\mu$m using the same CVD device and the organic waveguide was formed in accordance with the described steps. For comparison, samples with no plasma process were also prepared.

The samples formed were heated for 5 minutes on a hot plate at 300° C., and thereafter a mechanical load was applied by slicing to examine whether separation had occurred.

The results showed that separation of silicon oxide had occurred in samples which were not subjected to the plasma process, and no separation had occurred and adhesion with the fluorinated polyimide was improved in samples which were subjected to the plasma process with an oxygen gas and nitrogen gas.

By observation by SEM of the surface of the fluorinated polyimide which was subjected to the plasma process, it was found that large numbers of small protrusions of around 0.5 $\mu$m or less were generated in samples subjected to the oxygen plasma process, whereas no change was observed in samples subjected to the nitrogen plasma process. From this observation, it can be speculated that the improvement in adhesion by the oxygen plasma process is due to the surface of the fluorinated polyimide which has turned into a rough surface. Meanwhile, it can be speculated that active functional groups are generated on the surface by some kind of a chemical change. The results were not only for the fluorinated polyimide and the same results were also obtained for the other polyimides and organic polymers.

As described, by depositing the inorganic dielectric to be the masking clad 4 after subjecting the surface of the organic polymer to the plasma process with an oxygen gas or nitrogen gas, the adhesion between the organic polymer and inorganic dielectric, and the heat resistance can be improved, and it becomes easier, for example, to provide a semiconductor laser on the same substrate in a hybrid manner.

The following describes an improvement process using an adhesive layer made of adhesive.

As the organic polymer, fluorinated polyimide was used, and as the adhesive layer, siloxylated polyimide (adhesive) was deposited in a thickness of around 500 Å by spin coating before depositing the inorganic dielectric as the masking clad 4. Then, the organic waveguide was formed in accordance with the described steps.

As a result, the adhesion improved compared with the case without adhesive, and no separation occurred even under a heat treatment of 300° C. However, separation did occur when a load was applied by slicing. It is speculated that this is due to the poor adhesion between the fluorinated polyimide which has undergone thermalpolymerization and imidized and the polyimide used as an adhesive, which resulted in separation.

In an attempt to solve this problem, in three stages of the heat treatment of the fluorinated polyimide at 100° C., 200° C., and 350° C., the siloxylated polyimide was deposited as an adhesive before the heat treatment of 350° C., and the heat treatment of 350° C. was carried thereafter. As a result, the adhesion between the adhesive and fluorinated polyimide improved, and as a result no separation of silicon oxide as the inorganic dielectric occurred even under an applied load by slicing.

As described, by the provision of the adhesive layer between the organic polymer and inorganic dielectric, the adhesion between the organic polymer and inorganic dielectric can be improved. Further, by forming the adhesive layer before the organic polymer undergoes thermalpolymerization, the adhesion between the organic polymer and inorganic dielectric can be further improved.

The adhesive of the adhesive layer is selected depending on the organic- polymer material, and a material other than siloxylated polyimide can be favorably used, and other organic polymers and silane coupling agents such as aminophenyl trimethoxysilane may also be used.

The following will describe the propagation loss of the organic waveguide as manufactured by the described method. As the material of the core section 3, a polyimide (Product Name PIX-3400, provided by Hitachi Chemical Co., Ltd.), a polyimide containing no siloxane (Product Name PIG, provided by Chisso Corporation), and a fluorinated polyimide (Product Name OPI-N1005, provided by Hitachi Chemical Co., Ltd.) were used. A multi-mode waveguide having the core section 3 in a thickness of 40 µm and width of 50 µm was manufactured by the described steps. As the inorganic dielectric of the masking clad 4 and overclad 5, silicon oxide having a thickness of 2 µm was used. To improve the adhesion between the organic polymer and silicon oxide as the inorganic dielectric, the plasma process with a nitrogen gas was carried out.

In this manner, waveguides having different lengths were manufactured, and when measurements of propagation loss were made with the wavelength of 650 nm by the cut-back method, the values of 34.0 dB/cm, 9.9 dB/cm, and 3.2 dB/cm were obtained for PIX-3400, PIG, and OPI-N1005, respectively.

Note that, here, even though the overclad 5 is separately provided, because the masking clad 4 serves as the upper clad of the core section 3, the problems of a large refractive index difference and the protection of the core section 3 can be relieved. In the case where the overclad 5 is not provided, air is used as a side clad.

[Second Embodiment]

Figure 3A:
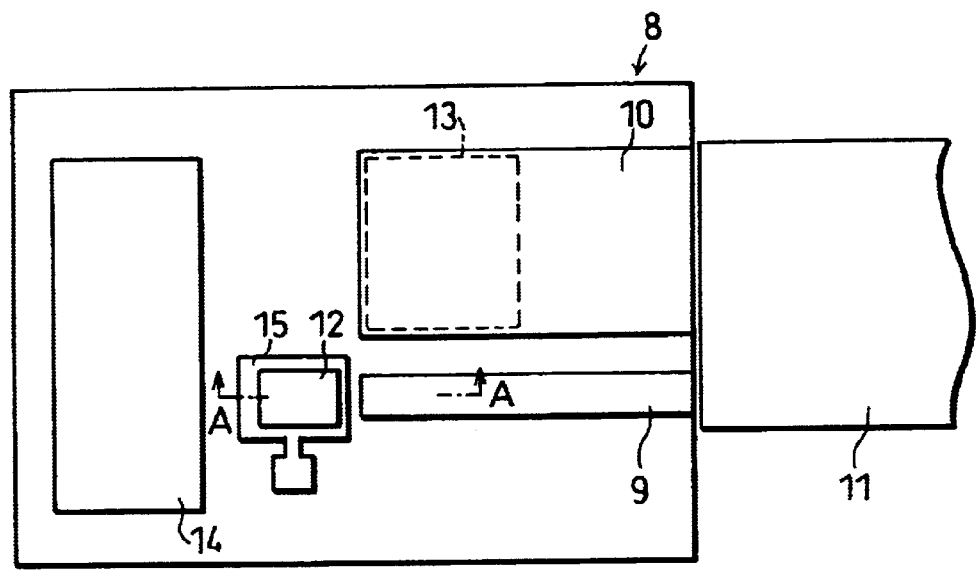
FIG. 3(a) is a schematic plan view of a two-way optical communications module as an optical part using the organic waveguide, which relates to another embodiment of the present invention.

The following will describe another embodiment of the present invention referring to FIG. 3 and FIG. 4.

Note that, for convenience of explanation, members having the same functions as the members described in the First Embodiment are given the same reference numerals and explanations thereof are omitted here.

FIG. 3($a$) and FIG. 3($b$) show a two-way optical communications module 8 as one example of an optical part in accordance with the present invention, in which FIG. 3($a$) is a schematic view and FIG. 3($b$) is a cross section of an optical transmitter. The following describes one example of the optical part of the present invention referring to FIG. 3($a$) and FIG. 3($b$).

In FIG. 3($a$), a transmission waveguide 9 and reception waveguide 10 are the organic waveguide as described in the First Embodiment. As shown in FIG. 3($b$), on the surface of the organic waveguide are formed an aluminium film 17, a TiW film 18, and a gold film 19 in this order with the thickness of 1 m, 2000 Å, 2000 Å, respectively, as the light-shield film 16.

By covering the organic waveguide with metal, entry of unwanted light into the organic waveguide from outside can be prevented, and, for example, in the two-way optical communications module 8 as shown in FIG. 3($a$) and FIG. 3($b$), a crosstalk between the transmission waveguide 9 and reception waveguide 10 can be prevented. Further, the light in the waveguide leaks out less often, reducing the propagation loss.

Furthermore, the adhesion between organic polymer and metal film is generally poor. However, by using the inorganic dielectric for the overclad 5, the adhesion with the metal film as the light-shield film 16 can be improved. As the light-shield film 16, other than aluminium, a metal such as copper and gold, and resin having low light transmissivity can also be used. The other arrangement of the organic waveguide is the same as the one described in FIG. 1, and explanation thereof is omitted here.

At one end of the two-way optical communications module 8 is provided a plastic optical fiber 11 to oppose one end of the transmission waveguide 9 and reception waveguide 10. The other end of the transmission waveguide 9 is provided with a semiconductor laser 12 on the bonding pad 15.

Under the end portion at the other end of the reception waveguide 10 is provided a photodiode 13 which is monolithically formed on the substrate 1. With the organic waveguide as described in the First Embodiment, the semiconductor laser 12 and the photodiode 13 can be easily formed on the same substrate with the organic waveguide.

With this arrangement, the emitted light from the semiconductor laser 12 propagates through the reception waveguide 9 and is coupled to the plastic optical fiber 11. The reception light propagated through the plastic optical fiber 11 is coupled to the reception waveguide 10, and is received by the photodiode 13 through the reception waveguide 10. By eliminating the buffer layer on the photodiode 13, the reception light propagated through the reception waveguide 10 is coupled to the photodiode 13.

In this two-way optical communications module 8, the transmission light and reception light are separated from each other by the organic waveguide, thus allowing spontaneous two-way communications with a single plastic optical fiber 11. Further, because the thickness of the organic waveguide can be made thick with ease, it can be efficiently coupled to a plastic optical fiber 11 having a large aperture. Note that, in FIG. 3(a), indicated by 14 is a control device for the two-way optical communications module 8.

As described, by employing as a constituting element the organic waveguide which uses the inorganic dielectric as the clad section (overclad 5, masking clad 4), the organic waveguide can be easily coupled to other optical elements, thus obtaining inexpensive optical parts which can be integrated efficiently.

Figure 3B:
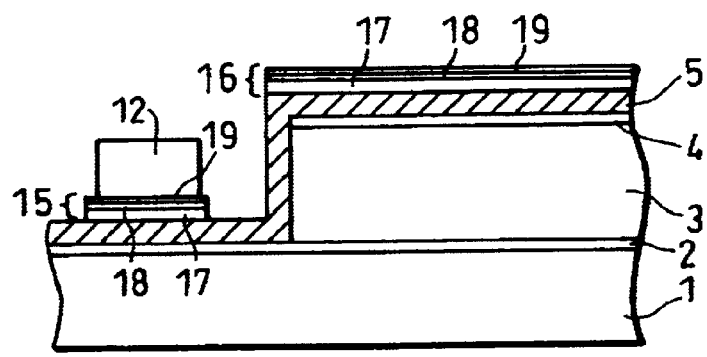
FIG. 3(b) is a cross section of FIG. 3(a) taken along the line A—A.

Further, as shown in the cross section of FIG. 3(b), the bonding pad 15, as with the light-shield film 16, is composed of the aluminium film 17, TiW film 18, and gold film 19, and is formed in the same step with the light-shield film 16. The following describes this step referring to FIG. 4(a) through FIG. 4(e).

Figure 4A:
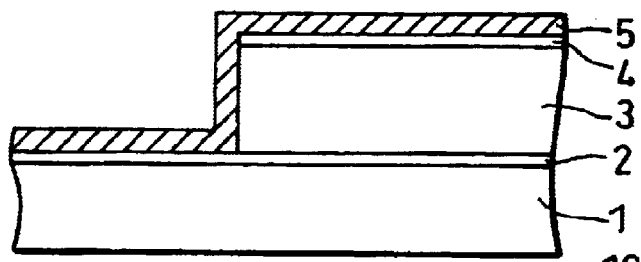
FIG. 4(a) through FIG. 4(e) are schematic drawings showing manufacturing steps of a light-shield film and a bonding pad when manufacturing the two-way optical communications module as shown in FIG. 3(a) and FIG. 3(b).

(1) First, by the manufacturing step of the organic waveguide as described in FIG. 2, the transmission waveguide 9 is made (see FIG. 4(a)).

Figure 4B:
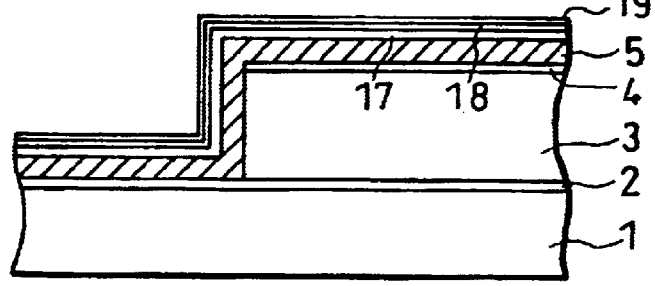

(2) Then, as shown in FIG. 4(b), as the light-shield film 16 of the organic waveguide and as the bonding pad 15 of the semiconductor laser 12, the aluminium film 17, TiW film 18, and gold film 19 are deposited in this order by sputtering in thicknesses of around 1 μm, 2000 Å, and 2000 Å, respectively.

Figure 4C:
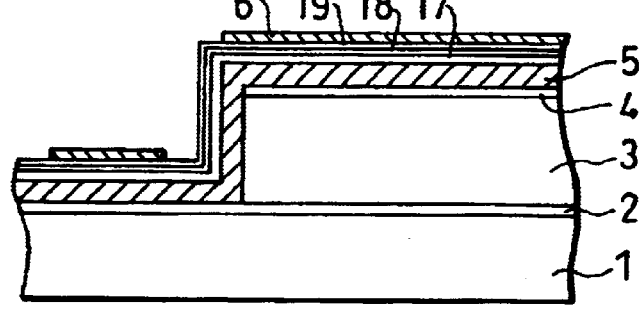

(3) Then, as shown in FIG. 4(c), the photoresist 6 is applied, and the photoresist 6 is removed by photolithography, leaving the bonding pad 15 and the light-shield film 16.

Figure 4D:
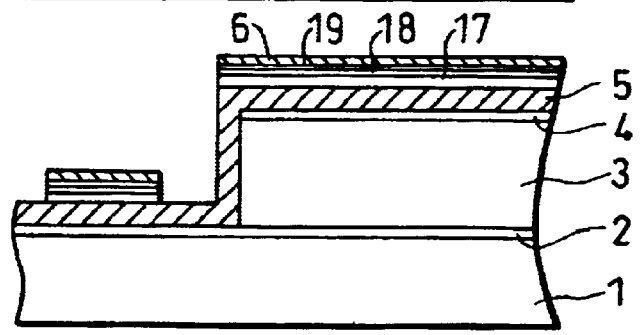

(4) Then, as shown in FIG. 4(d), portions of the gold film 19, TiW film 18, and aluminium film 17 which are not required are removed by wet etching.

Figure 4E:
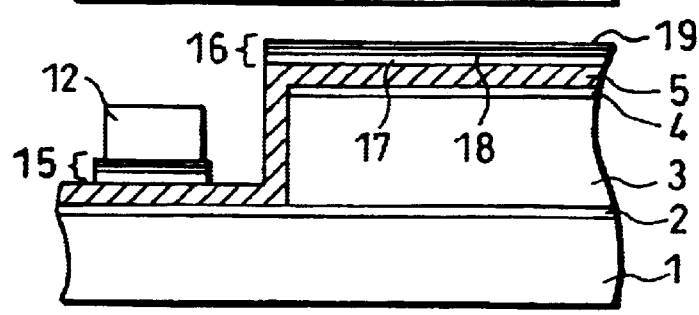
Figure 5A:
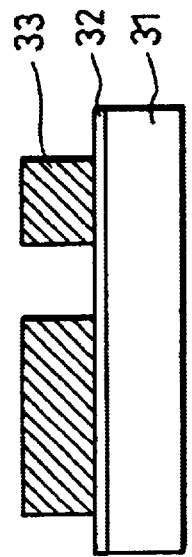
FIG. 5(a) through FIG. 5(f) are schematic drawings showing manufacturing steps of a conventional organic waveguide.
Figure 5B:
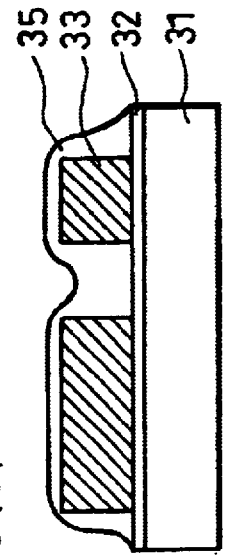
Figure 5C:
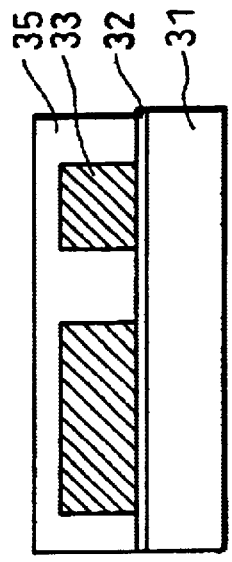
Figure 5D:
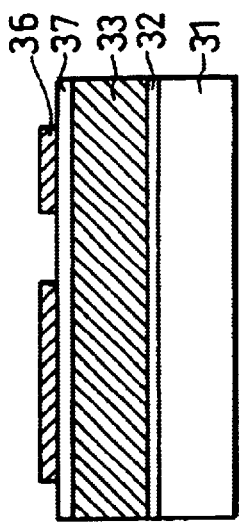
Figure 5E:
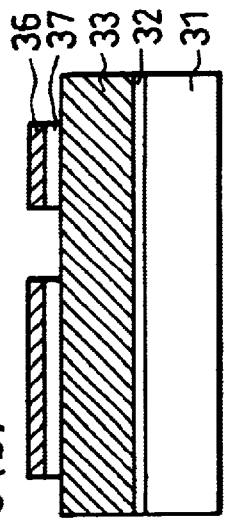
Figure 5F:
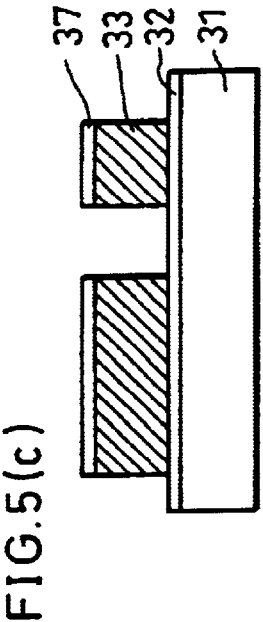

(5) Then, as shown in FIG. 4(e), an indium sheet having a thickness of around 1 μm is stuck on the bonding pad 15, and the semiconductor laser 12 is provided thereon, and by carrying out a heat treatment at a temperature of around 300° C., the semiconductor laser 12 is bonded on the bonding pad 15.

As described, by forming the light-shield film 16 and the bonding pad 15 in the same step, the manufacturing steps can be simplified, thus obtaining the optical part inexpensively. The arrangement of the bonding pad 15 is not just limited to the aluminium film 17, TiW film 18, and gold film 19 as described above, and, for example, a material having a high heat conductivity may be formed as a heat sink under the aluminium.

Obviously, the described arrangement is just one example of the present invention, and the organic waveguide of the present invention can be applied to other optical communications devices and optical integrated circuits to obtain inexpensive and highly reliable optical parts which can be integrated efficiently.

The organic waveguide of the present invention has an arrangement which includes a core section made of organic polymer, and a clad section covering the core section and made of inorganic dielectric having a lower refractive index than that of the core section, and preferably the inorganic dielectric to be the clad section is formed by a sputtering method, CVD method, or vapor deposition method.

A first manufacturing method of an organic waveguide of the present invention includes the step of forming an inorganic dielectric layer as a clad section on an organic polymer layer processed into a core section, and the inorganic dielectric layer is formed by a CVD method, sputtering method, or vapor deposition method.

With the above arrangement and method, because the clad section is made of inorganic dielectric having a lower refractive index than that of the core section, it is possible to use the sputtering method, CVD method, or vapor deposition method, etc., to form the clad section, which were not allowed with the organic polymer, thus forming the clad section in the same shape as that of the core section with ease.

As a result, an organic waveguide which can be desirably coupled with other optical elements can be obtained without the conventional process on the side portions of the clad section, thereby allowing integration with other optical elements and simplifying manufacturing steps.

In other words, because the clad section can be easily formed into the same shape as that of the core section, the effect as compared with the conventional organic waveguide having a clad section made of organic polymer is that an organic waveguide can be easily coupled with other optical elements such as a semiconductor laser, and can be easily integrated while simplifying manufacturing steps.

In the organic waveguide of the present invention, it is further preferable that a portion of the clad section constitutes a masking clad section which serves as a mask when processing the core section.

A second manufacturing method of an organic waveguide of the present invention includes the steps of forming an organic polymer layer which becomes a core section by processing; forming an inorganic dielectric layer to be a clad section on the organic polymer layer; processing the inorganic dielectric layer into a shape covering only an upper surface of the core section; and processing the inorganic dielectric layer into the core section by dry etching using as a mask the inorganic dielectric layer processed.

With this arrangement and method, because the clad section covering the upper surface of the core section is used as a mask, it is not required to remove the mask after the core section is processed, and as a result the manufacturing steps of the organic waveguide can be reduced and other elements are prevented from being adversely affected when the mask is removed. Here, in order to realize the masking upper clad section, it is required to select an inorganic dielectric having a large selective ratio with respect to the organic polymer in RIE using an oxygen gas.

The organic waveguide of the present invention may have an arrangement wherein a light-shield film is formed around the clad section.

Also, the first and second manufacturing methods of an organic waveguide of the present invention may further include the step of forming a light-shield film covering the inorganic dielectric layer to be the clad section.

Because the waveguide is surrounded and covered by the light-shield film, entry of unwanted light into the waveguide can be prevented, thus preventing interference. Further, despite the fact that the adhesion between the organic polymer and a metal film is generally poor, a resin having a low transmissivity or a metal such as aluminium or copper is used as the light-shield film, and this has created the problem of separation of the light-shield film made of a metal film. However, in the present invention, because the inorganic dielectric layer is provided as a clad section, the adhesion of the light-shield film of a metal film is improved and separation occurs less often.

Further, as the inorganic dielectric making up the clad section of the organic waveguide, silicon oxide is preferable.

Silicon oxide generally has a lower refractive index than that of the organic polymer such as polyimide and PMMA, which allows the silicon oxide to be used not only as the clad section but, due to its large selective ratio with respect to the organic polymer in RIE using an oxygen gas, also as a mask when the organic polymer layer is processed into the core section.

Thus, the above second manufacturing method can be realized with the use of silicon oxide. As a result it is not required to remove the mask for processing the core section, simplifying manufacturing steps, and it is possible to reduce the residue generated because, compared with a metal such as aluminium, silicon oxide is more resistant to sputtering when used as a mask.

As the main component of the organic polymer making up the core section of the organic waveguide of the present invention, polyimide, polycarbonate, polymethylmethacrylate (PMMA), and polystyrene, etc., may be used, of which polyimide is preferable.

Polyimide can be desirably processed in RIE using an oxygen gas and it has a high transmissivity. Further, because of the high heat resistance, a heat treatment for forming ohmic electrodes can be carried out without a problem even when a semiconductor laser is placed on the same substrate, thus allowing integration with other elements with ease. In this manner, by using polyimide as a main component for forming the core section of the present invention, a propagation loss can be reduced at high transmissivity, and integration with other elements, which requires heating, can be easily carried out by the high heat resistance.

Of polyimides, a polyimide containing no silane and fluorinated polyimide are particularly preferable.

This is because when silane is contained, the silicon component is not etched by RIE with an oxygen gas and it remains to cause residue. Thus, by using a polyimide containing no silane, it is further ensured and possible to reduce the etching residue generated when RIE with an oxygen gas is used to process the core section.

A fluorinated polyimide is preferable because it has a high transmissivity and with which a waveguide with a small propagation loss can be obtained. Further, the heat resistance is high and a fluorine component is generated in RIE with an oxygen gas, and for this reason, for example, even when the silicon component is generated from the mask or substrate, etching is allowed and the residue generated is reduced. As the fluorinated polyimide, for example, an acid dianhydride of polyimide, diamine, or a fluorinated product of these two compounds may be used.

Further, in the organic waveguide of the present invention, it is preferable that an adhesive layer for improving adhesion between the organic polymer layer and inorganic dielectric layer is formed between the core section and the clad section. It is further preferable that the adhesive layer is formed before the organic polymer to be the core section is subjected to thermalpolymerization.

Similarly, it is preferable that the first and second manufacturing methods of an organic waveguide of the present invention include the step of forming the adhesive layer for improving adhesion between the organic polymer and inorganic dielectric before forming the inorganic dielectric layer on the organic polymer layer, and it is further preferable that the step of forming the adhesive layer is carried out before the organic polymer is subjected to thermalpolymerization.

The adhesion between the organic polymer layer and the inorganic dielectric layer is relatively poor, and thus by forming the adhesive layer which exhibits adhesion for the materials of the both layers, the adhesion between the organic polymer layer and the inorganic dielectric layer can be improved, and as a result no separation occurs, for example, even under a heat treatment at high temperatures and a mechanical load such as slicing. Further, because the inorganic dielectric layer also serves as a mask in the present invention, by improving the adhesion with the organic polymer, improvement in processing accuracy when used as a mask can also be expected.

After the organic polymer is subjected to thermal polymerization, there is a case where active functional groups on the surface may be reduced, and in particular when fluorinated polyimide is used as the organic polymer, the adhesion between the organic polymer layer and the adhesive layer becomes weak after imidization by thermal polymerization. Thus, by forming the adhesive layer before the organic polymer is subjected to thermal polymerization as described above, it is further ensured that the adhesion between the organic polymer layer and the inorganic dielectric layer is improved.

As the adhesive layer, a material having a lower refractive index than that of the core section is preferable. However, if the thickness of the adhesive layer is made sufficiently thinner compared with the thickness of the core section, it is possible to use an organic polymer such as siloxylated polyimide, and a silane coupling agent such as aminophenyl trimethoxysilane, regardless of their refractive indices.

Further, the first and second manufacturing methods of an organic waveguide of the present invention may include the step of subjecting the surface of the organic polymer layer to a plasma process before forming the inorganic dielectric layer on the organic polymer layer, instead of forming the adhesive layer.

By the plasma process on the surface of the organic polymer layer, the surface of the organic polymer undergoes a physical or chemical change, and the adhesion with the inorganic dielectric layer can be improved. As a result, no separation occurs, for example, even under a heat treatment at high temperatures and a mechanical load such as slicing.

As the plasma process, a plasma process using a gas containing at least an oxygen element and a plasma process using a gas containing at least a nitrogen element are particularly preferable.

In the former, by the plasma process by oxygen plasma, the organic polymer is etched and the surface becomes rough, and the adhesion between the organic polymer and the inorganic dielectric layer is improved. In the latter, by the plasma process by nitrogen plasma, active functional groups are generated on the surface, and the adhesion between the organic polymer and the inorganic dielectric layer is improved.

An optical part of the present invention, in which an organic waveguide and an optical element such as a photo-emitting element, photo-receptive element, and lens are formed on a single substrate includes the organic waveguide as described above, or the organic waveguide as manufactured by the first and second manufacturing methods of the present invention.

As described, the organic waveguide of the present invention, or the organic waveguide as manufactured by the first and second manufacturing methods of the present invention can be easily integrated with other optical elements, and generates less residue in an RIE process, and can be manufactured with less steps. Thus, by using such an organic waveguide as a constituting element, optical parts which are processed with precision and which are highly integrated can be obtained inexpensively.

The manufacturing method of an optical part of the present invention is for manufacturing the optical part as described above, wherein, using a semiconductor laser as the photo-emitting element, a bonding of the semiconductor laser or a pad used in wiring is formed in the same step with the light-shield film which is to cover the clad section of the organic waveguide.

By making the bonding pad of the semiconductor laser or the wiring pad in the same step with the light-shield film of the organic waveguide, the manufacturing steps of the optical part can be further simplified and the cost can be further reduced.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An organic waveguide comprising:
    a substrate;
    a buffer layer over the substrate;
    a core section over the buffer layer, the core section being made of organic polymer; and
    a clad section covering an upper surface of the core section and made of inorganic dielectric having a lower refractive index than that of the core section, the inorganic dielectric consisting essentially of silicon oxide, and the clad section has substantially the same shape and closely conforms to the core section, wherein an adhesive layer for improving adhesion between the organic polymer and the inorganic dielectric is provided between the core section and the clad section.

2. The organic waveguide as set forth in claim 1, wherein the upper surface of the organic polymer layer has been subjected to a plasma process before the inorganic dielectric was formed on the organic polymer.

3. The organic waveguide as set forth in claim 2, wherein the plasma process is carried out using a gas containing at least an oxygen element.

4. The organic waveguide as set forth in claim 2, wherein the plasma process is carried out using a gas containing at least a nitrogen element.

5. The organic waveguide as set forth in claim 1, wherein a portion of the clad section constitutes a masking clad section which serves as a mask when processing the core section.

6. The organic waveguide as set forth in claim 5, wherein the upper surface of the organic polymer layer has been subjected to a plasma process before the inorganic dielectric was formed on the organic polymer.

7. The organic waveguide as set forth in claim 6, wherein the plasma process is carried out using a gas containing at least an oxygen element.

8. The organic waveguide as set forth in claim 6, wherein the plasma process is carried out using a gas containing at least a nitrogen element.

9. The organic waveguide as set forth in claim 1, wherein a light-shield film is formed around the core section including the clad section.

10. The organic waveguide as set forth in claim 1, wherein the inorganic dielectric constituting the clad section is silicon oxide.

11. The organic waveguide as set forth in claim 1, wherein a main component of the organic polymer constituting the core section is polyimide.

12. The organic waveguide as set forth in claim 11, wherein the polyimide is a polyimide containing no silane.

13. The organic waveguide as set forth in claim 11, wherein the polyimide is a fluorinated polyimide.

14. The organic waveguide as set forth in claim 1, wherein the adhesive layer is formed before the organic polymer to be the core section is subjected to thermal polymerization.

15. The organic waveguide as set forth in claim 1, wherein the clad section has a thickness of several microns.

16. The organic waveguide as set forth in claim 1, wherein the clad section has a thickness of about 2 microns.

17. The organic waveguide as set forth in claim 1, wherein the clad section has been formed by sputtering, CVD or vapor deposition.

18. An optical part, which comprises:
    an organic waveguide; and
    an optical element selected from the group consisting of a photo-emitting element, a photo-receptive element and a lens, wherein the organic waveguide and the optical element are formed on a single substrate,
    and the organic waveguide comprises:
        a buffer layer over the substrate;
        a core section over the buffer layer, the core section being made of organic polymer; and
        a clad section covering an upper surface of the core section and made of an inorganic dielectric having a lower refractive index than that of the core section, the inorganic dielectric consisting essentially of silicon oxide, and the clad section has substantially the same shape and closely conforms to the core section, wherein an adhesive layer for improving adhesion between the organic polymer and the inorganic dielectric is provided between the core section and the clad section.

19. The optical part as set forth in claim 18, wherein the inorganic dielectric of the clad section is formed by a sputtering method, a CVD method or a vapor deposition method.

20. The optical part as set forth in claim 18, wherein a portion of the clad section comprises a masking clad section which serves as a mask when processing the core section.

* * * * *